Oct. 28, 1924.
J. F. O'CONNOR
HAND BRAKE
Filed Dec. 30, 1922
1,513,129
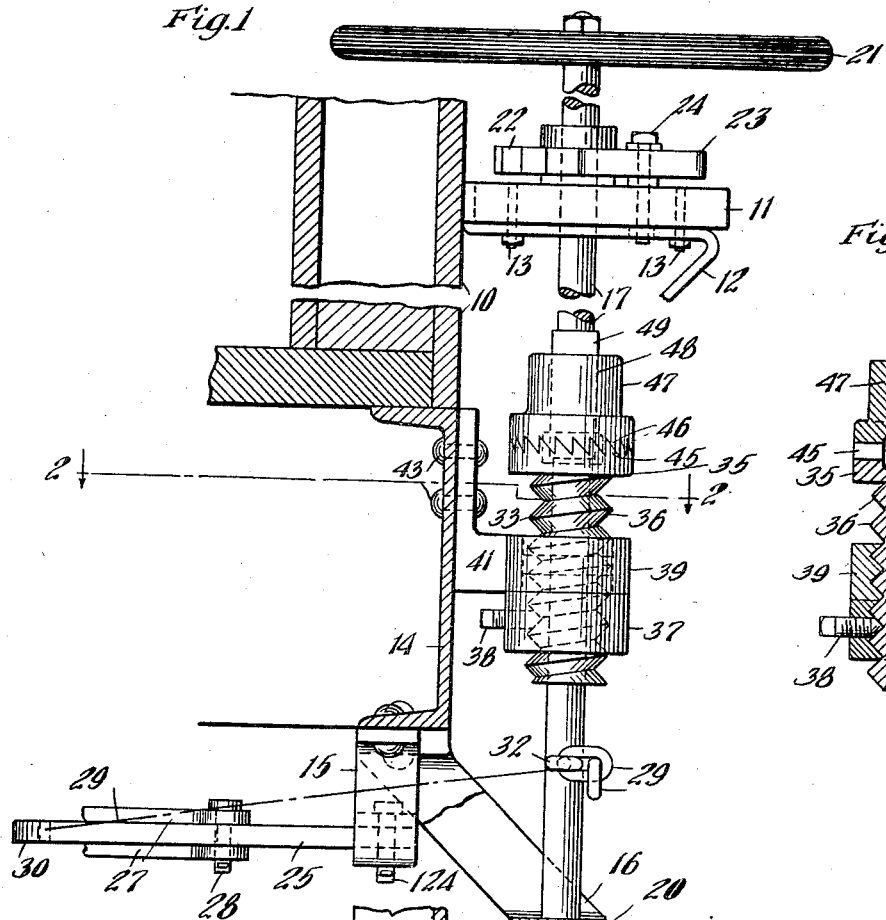

Patented Oct. 28, 1924.

1,513,129

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

HAND BRAKE.

Application filed December 30, 1922. Serial No. 609,787.

*To all whom it may concern:*

Be it known that I, JOHN F. O'CONNOR, a citizen of the United States, residing at Chicago, in the county of Cook and State of Illinois, have invented a certain new and useful Improvement in Hand Brakes, of which the following is a full, clear, concise, and exact description, reference being had to the accompanying drawings, forming a part of this specification.

This invention relates to hand brakes.

One object of my invention is to provide a hand brake for railway cars, wherein the revolutions of the brake staff necessary to tighten the brakes are limited to a predetermined number and wherein the increase in slack of the brake chain, due to the wearing away of the brake shoe faces and other parts of the brake mechanism, is compensated for automatically, so that the number of turns of the staff necessary to tighten the brakes, as predetermined, always remain substantially constant.

A more specific object of the invention is to provide in a device of the character described, a stop mechanism, which is adjustable for predetermining the number of revolutions of the brake staff, and a clutch element co-acting with said stop mechanism for positively limiting the revolutions of the brake staff to a predetermined number, in releasing the brakes, and operative during the tightening operation to compensate automatically for any increase in slack of the brake chain due to wearing of the brake shoe faces and other parts of the brake mechanism during service, whereby the number of turns of the staff necessary to tighten the brakes as predetermined, will always remain substantially constant.

Another object of the invention is to provide in a device of the type specified, lever mechanism for multiplying the ratio of leverage of the brake staff to exert greater force in the application of the brakes.

In the drawing forming a part of this specification, Fig. 1 is a side elevation of a hand brake of the vertical staff type showing my improvements in connection therewith, parts being broken away and in section. Fig. 2 is a horizontal sectional view taken substantially on the line 2—2 of Fig. 1. And Fig. 3 is a vertical sectional view taken substantially centrally of the brake staff, stop mechanism and clutch.

In said drawings, 10 indicates the end wall of a car, said wall being provided with a platform 11 supported by a bracket 12 suitably secured thereto by bolts 13, and 14 indicates the end sill to which is secured a depending angular bracket 15 and an outwardly extending depending stirrup 16.

A brake staff 17 is journaled within the platform 11 and has its lower reduced end 18 journaled within a suitable bearing opening 19 in the horizontal portion 20 of the stirrup 16. The upper end of the brake staff is provided with the usual hand wheel 21 rigidly secured thereto in any suitable manner so as to rotate the same. The brake staff is also provided with the usual ratchet member 22 co-acting with a locking pawl 23 pivoted on the platform 11 by a bolt 24.

A lever 25, swinging in a horizontal plane, is pivotally supported at one end of the bracket 15 by means of the pivot pin 124. The lever 25 is connected to the brake mechanism proper by means of a link 26 having a forked end 27 pivoted on the pin 28 intermediate the ends of the lever 25. A chain 29 having one end secured to the free end 30 of the lever 25 as indicated at 31 has its opposite end connected to the brake staff by means of an eye bolt 32.

A sleeve 33 is slidably and rotatably mounted on the cylindrical portion 34 of the brake staff 17. The sleeve 33 is enlarged at its upper end to provide an integral collar 35 and is provided with external screw threads 36 extending from the collar 35, to the lower end of the sleeve. A collar 37 provided with internal screw threads co-acting with the external threads 36 of the sleeve 33, is adjustably mounted on the lower end of said sleeve and is adapted to be held in fixed adjusted position by a set screw 38.

An internally threaded collar 39 adapted to receive the screw threaded portion 36 of the sleeve 33 is disposed between the collars 35 and 37 and acts as a stop for said collars 35 and 37. The collar 39 is provided with an integral arm 40 projecting laterally therefrom and connected at its outer end to a bracket 41 by means of a pin 42, said bracket being rigidly secured to the outer face of the end sill 14 by rivets 43 or any other suitable means. As clearly shown in Fig. 2, the opening 44 which receives the pivot pin 42 is elongated lengthwise of the arm to allow for a certain amount of play between the arm and the pivot pin 42 for a purpose hereinafter described.

The upper face of the collar 35 on the sleeve 33 is provided with an annular series of clutch teeth 45 co-acting with a similar series of clutch teeth 46 projecting from the lower face of the vertically sliding clutch member 47. The clutch member 47 is provided with a bore 48 of square cross section adapted to slidingly receive the square portion 49 of the staff 17, whereby the clutch member 47 is mounted for positive rotation with said staff and for sliding movement longitudinally thereof. The co-acting teeth 45 and 46 on the collar 35 and the clutch element 47 are so arranged that relative rotation of the latter in a contraclockwise direction will be prevented. The inclination of the teeth 45 and 46 is such that when the brake staff is rotated in a clockwise direction, the resistance offered between said teeth will normally be sufficient to rotate the sleeve 33 in unison with the clutch element 47, but upon a predetermined resistance being encountered by the sleeve, such as results when the collar 37 is arrested by engagement with the fixed collar 39, the clutch element 47 will be permitted to slip relative to the sleeve for a purpose hereinafter described.

In the operation of the improved hand brake, herein shown, upon rotation of the hand wheel 21 in a clockwise direction, the brake chain 29 will be wound upon the lower end of the staff 17 thereby swinging the lever 25 on its pivot and effecting a pulling force on the link 27 to apply the brakes. During this operation the clutch element 47 will rotate with the staff 17 and through the frictional engagement between the teeth 46 and 45 will rotate the sleeve 33 in a clockwise direction, thereby causing the same to move downwardly on the staff 17 due to the screw threaded connection between the sleeve and the fixed collar 39. This movement of the sleeve 33 will continue until the lower face of the collar 35 engages with the upper face of the fixed collar 39 whereupon downward movement and rotation of the sleeve 33 will be positively arrested. When rotation of the sleeve has thus been brought to a stop, and assuming that the brake chain has not been completely wound upon the brake staff so as to set the brakes, that is, if any slack remains in the chain, the friction between the teeth 45 and 46 will be overcome and the clutch element 47 will slip over the teeth of the sleeve 33, thus allowing the brakes to be properly applied and the clutch element 47 to advance relatively in a rotary direction with reference to the sleeve 33, and the teeth 45 and 46 to re-engage with the clutch parts in relatively different positions, to compensate for the increased travel of the brake chain. It is of course obvious, that when the brake has been set, the pawl 23 and the ratchet 22 will lock the brake in tightened position in a usual and well known manner. In this connection it is pointed out that all binding between the sleeve 33 and the collar 39 due to deflection or distortion of the brake staff during the tightening operation is prevented by the loose pivoted connection provided between the bracket 41 and the end of the arm 40 comprising the elongated recess 44 and the pin 42 which permit the necessary amount of movement of the parts in all directions in a horizontal plane.

Upon release of the brakes and during the unwinding of the chain, the staff will be rotated in a contraclockwise direction and the sleeve 33 and the clutch element 47 will be rotated in unison while the sleeve 33 by its threaded engagement with the fixed collar 39 is caused to travel upwardly on the staff 17. The rotation of the staff will continue as described until the collar 37 engages with the lower face of the fixed collar 39 whereupon upward movement and rotation of the sleeve 33 will be arrested, and rotation of the brake staff 17 will be positively stopped due to the interlocking arrangement of the teeth on the sleeve and the clutch element.

It will be evident that by the arrangement described, the number of turns of the brake wheel necessary to set the brakes is always kept substantially constant and that, as the parts of the brake mechanism and especially the shoe faces become worn and the slack in the brake chain is increased due to this wearing of the parts, the adjustable clutch members comprising the clutch element 47 and the sleeve 35 will automatically compensate for the same.

It will also be evident that by adjusting the collar 37 of the screw threaded portion of the sleeve, the distance between the collars 35 and 37 may be varied, thereby varying the number of the revolutions of the staff in release of the brakes. In the present instance, as shown in Fig. 1, two convolutions of the thread are left between the upper face of the fixed collar 39 and the collar 35, thereby permitting but two revolutions of the staff in the release of the brakes which will ordinarily suffice.

It is also obvious that the clutch element 47 may be manually disengaged from the sleeve 33 so that full chain slack is available when applying new brake shoes or wheels. After replacement of the parts, the first application of the brakes will automatically re-adjust the slack as originally provided by the setting of the collar 37.

I have herein shown and described what

I now consider the preferred manner of carrying out my invention, but the same is merely illustrated and I contemplate all changes and modifications that come within the scope of the claims pending hereto.

I claim:

1. In a hand brake, the combination with a rotatable brake staff; of means for limiting the revolutions thereof to a predetermined number, said means being substantially permanently associated with said staff and being adjustable to progressively vary the number of revolutions of said staff.

2. In a hand brake, the combination with a rotatable brake staff; of means for limiting the revolutions thereof to a predetermined number, comprising a fixed stop and a co-operating movable stop actuated by said brake staff, and adapted to travel lengthwise thereof.

3. In a hand brake, the combination with a rotatable brake staff proper, adapted to have a brake chain wound thereon; of a fixed stop; a traveling member provided with a pair of stops co-acting with said fixed stop and adapted to have its movement limited thereby; and connections between said member and said brake staff whereby the rotary movement of said staff is positively limited in one direction and resisted beyond a fixed limit in the opposite direction until a predetermined force is applied.

4. In a hand brake, the combination with a rotatable brake staff; of means for limiting the revolutions of the same to a predetermined number, said means including a member adapted to travel lengthwise of said brake staff; and automatically operating adjusting means between said first named means and the brake staff, whereby increased slack in the brake chain is compensated for.

5. In a hand brake, the combination with a vertical rotatable brake staff adapted to have a brake chain wound thereon; of a fixed stop; a movable member directly co-acting therewith; and means for connecting said movable member with the brake staff for positively moving the former in one direction until limited by the stop, whereby rotation of said brake staff proper is arrested.

6. In a hand brake, the combination with a rotatable brake staff; of a fixed stop; a member slidably and rotatably mounted on said staff; said member having means thereon adapted to engage said stop to limit the movement of said member; and clutch means for connecting said member and said staff.

7. In a hand brake, the combination with a brake staff, said staff being rotatable in opposite directions to wind and unwind the chain; of means for positively limiting the rotation of the staff in one direction and resisting rotation beyond a fixed limit in the opposite direction until a predetermined force is applied, said means being adjustable to vary the number of revolutions of said staff.

8. In a hand brake, the combination with a brake staff, said staff being rotatable in opposite directions to wind and unwind the chain; of means having limited movement in opposite directions lengthwise of said staff, for positively limiting the rotation of said staff in one direction; and an adjustable connection between said means and said brake staff whereby increased slack in the rigging is compensated for.

9. In a hand brake, the combination with a brake staff, said staff being rotatable in opposite directions to wind and unwind the chain; of means having limited movement in opposite directions, lengthwise of said staff, for positively limiting the rotation of said staff in one direction, said means being adjustable to vary the number of revolutions of said staff; and an adjustable connection between said means and the brake staff whereby increased slack in the rigging is compensated for.

10. In a hand brake the combination with a rotary brake staff; of a sleeve rotatably and slidably journaled on said staff, said sleeve being provided with spaced stop means and an intermediate screw threaded section; a fixed stop member adapted to co-act with said stop means, to limit the sliding movement of said sleeve, said stop member being provided with a screw threaded portion adapted to co-act with said screw threaded section; a clutch member fixed to said sleeve; and a co-acting clutch member slidably mounted on said staff for rotation therewith.

11. In a hand brake, the combination with a rotatable brake staff; of a sleeve rotatably and slidably journaled on said staff, said sleeve being provided with spaced relatively adjustable stop means and a screw threaded section; a fixed stop member adapted to co-act with said stop means to limit the sliding movement of said sleeve, said stop member being provided with a screw threaded portion adapted to co-act with said screw threaded section; a clutch member fixed to said sleeve; and a co-acting clutch member slidingly mounted on said staff for rotation therewith.

12. In a hand brake, the combination with a rotary brake staff, of a sleeve slidably and rotatably journaled on said staff, said sleeve being provided with a screw threaded section, a relatively fixed stop means at one end, an adjustable stop means threaded on said sleeve, and means for securing said last named stop means in fixed position on said sleeve; a fixed stop member adapted to co-act with said stop means to limit the sliding movement of said sleeve, said stop member being provided with a screw threaded portion adapted to co-act with said screw threaded section of said sleeve; a clutch member fixed to said sleeve; and a co-acting clutch member slidably mounted on said staff for rotation therewith.

13. In a hand brake, the combination with means reversely movable in two directions for tightening and slackening brakes; of means including an element reciprocable lengthwise of said first named means for positively limiting the movement thereof in a brake slackening direction, said second named means also including a connecting clutch element co-acting with said first named means and said element, automatically operable on movement of said first named means in a brake tightening direction to compensate for increased slack in the brake mechanism.

14. In a hand brake, the combination with means reversely movable in two directions for tightening and slackening the brakes; of adjustable means for limiting movement of said first named means in one direction; and an adjustable connection between said first named and second named means whereby increased slack in the brake mechanism is compensated for.

15. In a hand brake, the combination with a brake chain; of a brake staff, said staff being rotatable in opposite directions to wind and unwind said chain; of means having limited movement in opposite directions for positively limiting the rotation of said staff in one direction; adjustable connections between said means and the brake staff whereby increased slack in the brake chain is compensated for; a lever pivoted at one end and having its opposite end connected to said brake chain; and connections between an intermediate portion of said lever and the brake mechanism proper, whereby the effective ratio of leverage of said staff is increased.

In witness that I claim the foregoing I have hereunto subscribed my name this 26th day of Dec. 1922.

JOHN F. O'CONNOR.

Witnesses:
FRANCES SAVAGE,
HARRIETTE M. DEAMER.